US009363241B2

(12) United States Patent
Deutsch et al.

(10) Patent No.: US 9,363,241 B2
(45) Date of Patent: Jun. 7, 2016

(54) CRYPTOGRAPHIC ENFORCEMENT BASED ON MUTUAL ATTESTATION FOR CLOUD SERVICES

(71) Applicants: Steven W. Deutsch, Folsom, CA (US); Abhilasha Bhargav-Spantzel, Santa Clara, CA (US)

(72) Inventors: Steven W. Deutsch, Folsom, CA (US); Abhilasha Bhargav-Spantzel, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 698 days.

(21) Appl. No.: 13/665,747

(22) Filed: Oct. 31, 2012

(65) Prior Publication Data
US 2014/0122873 A1    May 1, 2014

(51) Int. Cl.
| | |
|---|---|
| H04L 29/06 | (2006.01) |
| G06F 7/04 | (2006.01) |
| G06F 15/16 | (2006.01) |
| G06F 17/30 | (2006.01) |

(52) U.S. Cl.
CPC ........ *H04L 63/0428* (2013.01); *H04L 63/0823* (2013.01); *H04L 63/0869* (2013.01); *H04L 63/0884* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 8,813,186 B2 | 8/2014 | Hegg et al. | |
| 8,843,997 B1 * | 9/2014 | Hare | ................................. 726/3 |
| 2004/0107360 A1 | 6/2004 | Herrmann et al. | |
| 2004/0167984 A1 | 8/2004 | Herrmann | |
| 2005/0278775 A1 | 12/2005 | Ross | |
| 2006/0059549 A1 | 3/2006 | Suzuki et al. | |
| 2007/0107043 A1 | 5/2007 | Newstadt et al. | |
| 2009/0319782 A1 | 12/2009 | Lee | |
| 2010/0088519 A1 | 4/2010 | Tsuruoka et al. | |
| 2011/0179477 A1 * | 7/2011 | Starnes et al. | ..................... 726/9 |
| 2011/0307947 A1 | 12/2011 | Kariv et al. | |

(Continued)

OTHER PUBLICATIONS

International Search Report and Written Opinion for Application No. PCT/US2012/031296 dated Nov. 26, 2012, 7 pages.

(Continued)

*Primary Examiner* — Azizul Choudhury
(74) *Attorney, Agent, or Firm* — Blakely, Sokoloff, Taylor & Zafman LLP

(57) ABSTRACT

In accordance with embodiments disclosed herein, there are provided systems, apparatuses, and methods for implementing cryptographic enforcement based on mutual attestation for cloud services. For example, in one embodiment, such means may include receiving, at the service provider, a request from a client, the request being for services from the service provider to the client; sending to a trust broker, from the service provider, a trust policy of the service provider against which trustworthiness attributes and capabilities of both the service provider and the client are to be evaluated by the trust broker; receiving, at the service provider, a certificate from the trust broker attesting to compliance of the service provider with the trust policy; sending the certificate from the service provider to the client for affirming mutual attestation of both the service provider and the client in compliance with the trust policy according to evaluation by the trust broker; establishing a connection between the service provider and the client for the service provider to render the requested services to the client; and encrypting information exchanged between the service provider and the client in fulfillment of the request for services from the client. Other related embodiments are further described.

30 Claims, 12 Drawing Sheets

(56) References Cited

U.S. PATENT DOCUMENTS

| | | | |
|---|---|---|---|
| 2012/0084570 A1* | 4/2012 | Kuzin et al. | 713/182 |
| 2013/0152169 A1 | 6/2013 | Stuntebeck | |
| 2013/0297662 A1 | 11/2013 | Sharma et al. | |
| 2014/0130035 A1 | 5/2014 | Desai et al. | |

OTHER PUBLICATIONS

International Preliminary Report on Patentability for Application No. PCT/US2012/031296 dated Oct. 9, 2014, 6 pages.

Office Action for U.S. Appl. No. 13/997,826 dated May 27, 2015, 32 pages.

Office Action for U.S. Appl. No. 13/997,826 dated Nov. 17, 2014, 25 pages.

PCT Application No. PCT/US2012/031296 filed on Mar. 29, 2012, 41 pages.

"Automated Trust Negotiations," by Winsborough et al., DARPA Information Survivability Conference and Exposition, 2000, 15 pages.

"Platform Capability Based Identity Management for Scalable and Secure Cloud Service Access," by Bhargav-Spantzel et al., Sep. 2010, 6 pages.

Extended European Search Report for European Patent Application No. 12872734.4 mailed Nov. 13, 2015, 7 pages.

Non-Final Office Action for U.S. Appl. No. 13/997,826, mailed Jan. 25, 2016, 33 pages.

* cited by examiner

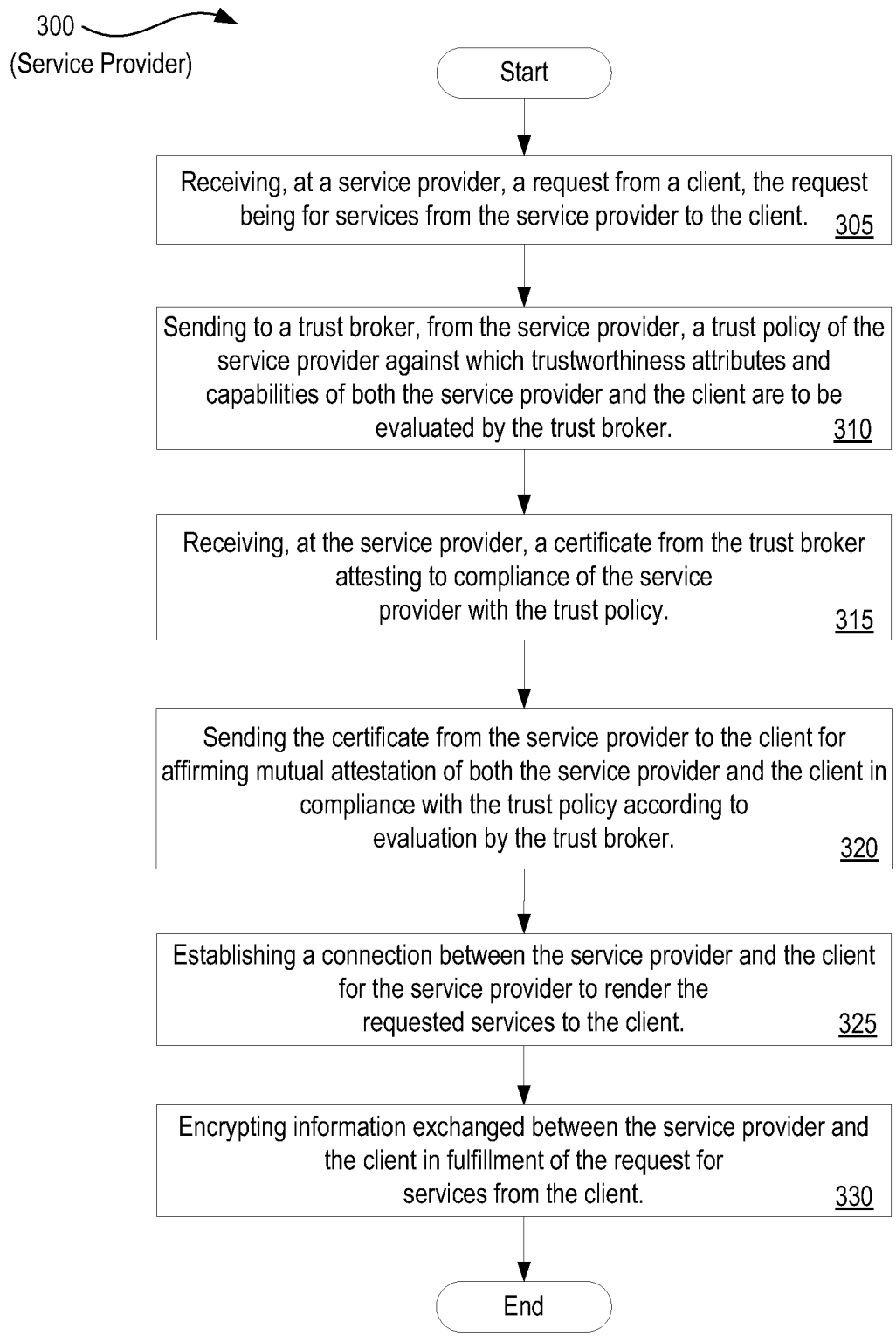

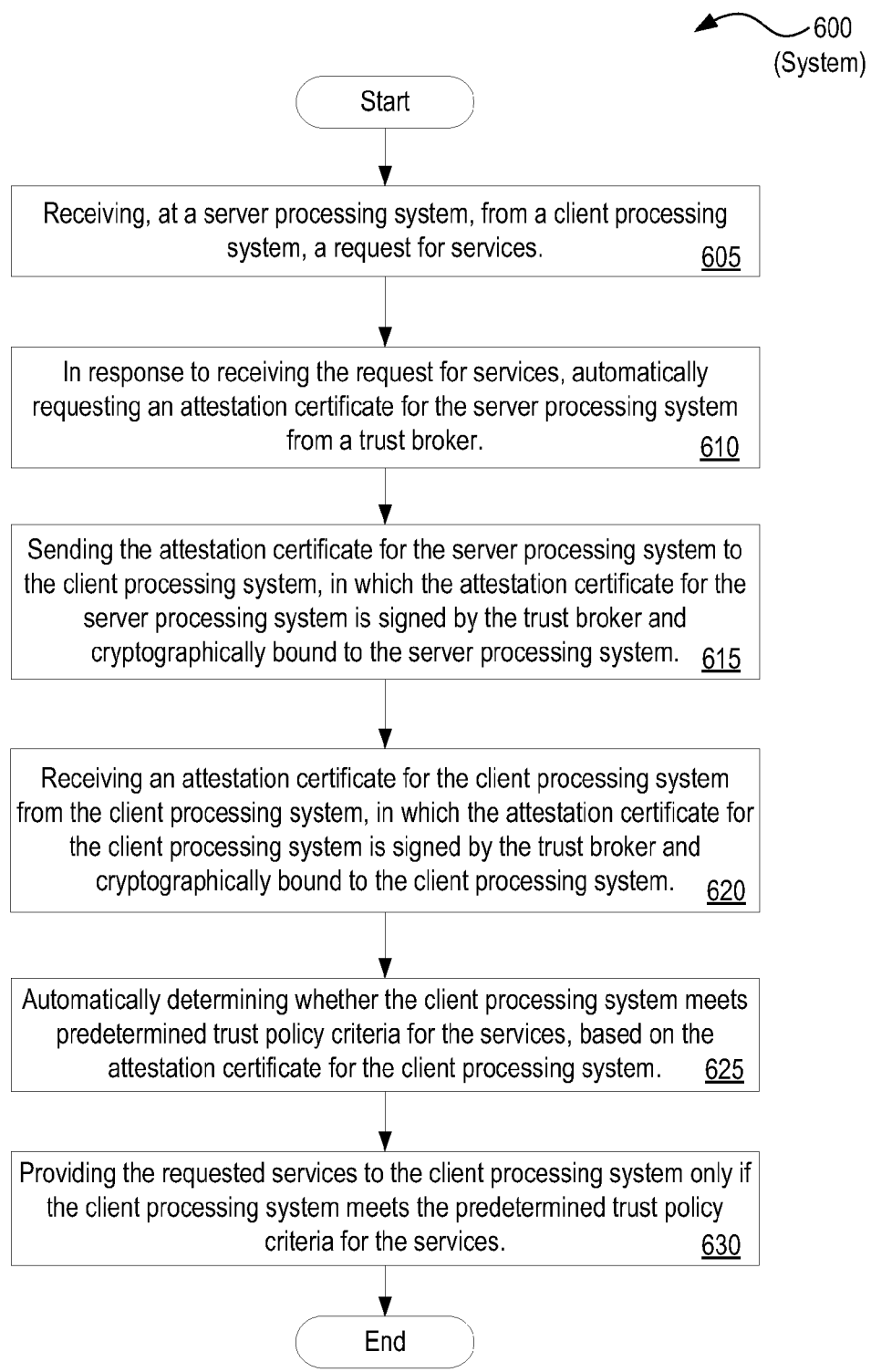

US 9,363,241 B2

CRYPTOGRAPHIC ENFORCEMENT BASED ON MUTUAL ATTESTATION FOR CLOUD SERVICES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to cryptographic enforcement based on mutual attestation for cloud services.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

The advent of modern computing, networking, Internet connectivity, and E-Commerce has brought innumerable benefits to society; however, these technologies have also introduced new risks and have opened up new opportunities for fraud and malicious attack.

Attackers continuously develop ever more sophisticated technologies and techniques by which they may perpetuate their fraud. Individuals and technology service providers must therefore provide ever improved counter-attacks resulting in a technological arms race as each party, friendly and foe, strives to gain technological superiority over the other. As more and more services transition from client-server based technology to "cloud computing" type technologies, the risks are amplified as increasing amounts of sensitive information is stored remotely from a user's own local and physically controlled computing hardware. For instance, unlike a user's locally stored information which is available online only intermittently and is just one target among countless others, a "cloud service" offers potential attackers a centralized location representing and providing the data of many users, and which is always accessible via a public Internet according to its own design.

Conventional techniques routinely require a user of such technology services to affirm their identity when requesting access to services, for example, by providing a "user name" and a "password." Unfortunately, such simple mechanisms are widely understood to be insufficient without additional safeguards. More sophisticated security mechanisms are desirable to better safeguard both service providers and their users against a variety of attacks, including those associated with viruses, malware, phishing, man-in-the-middle attacks and others.

The present state of the art may therefore benefit from the systems, apparatuses, and methods for implementing cryptographic enforcement based on mutual attestation for cloud services as described herein.

BRIEF DESCRIPTION OF THE DRAWINGS

Embodiments are illustrated by way of example, and not by way of limitation, and will be more fully understood with reference to the following detailed description when considered in connection with the figures in which:

FIGS. 3, 4, 5, and 6 are flow diagrams illustrating methods for implementing cryptographic enforcement based on mutual attestation for cloud services in accordance with described embodiments;

DETAILED DESCRIPTION

Figure 1:
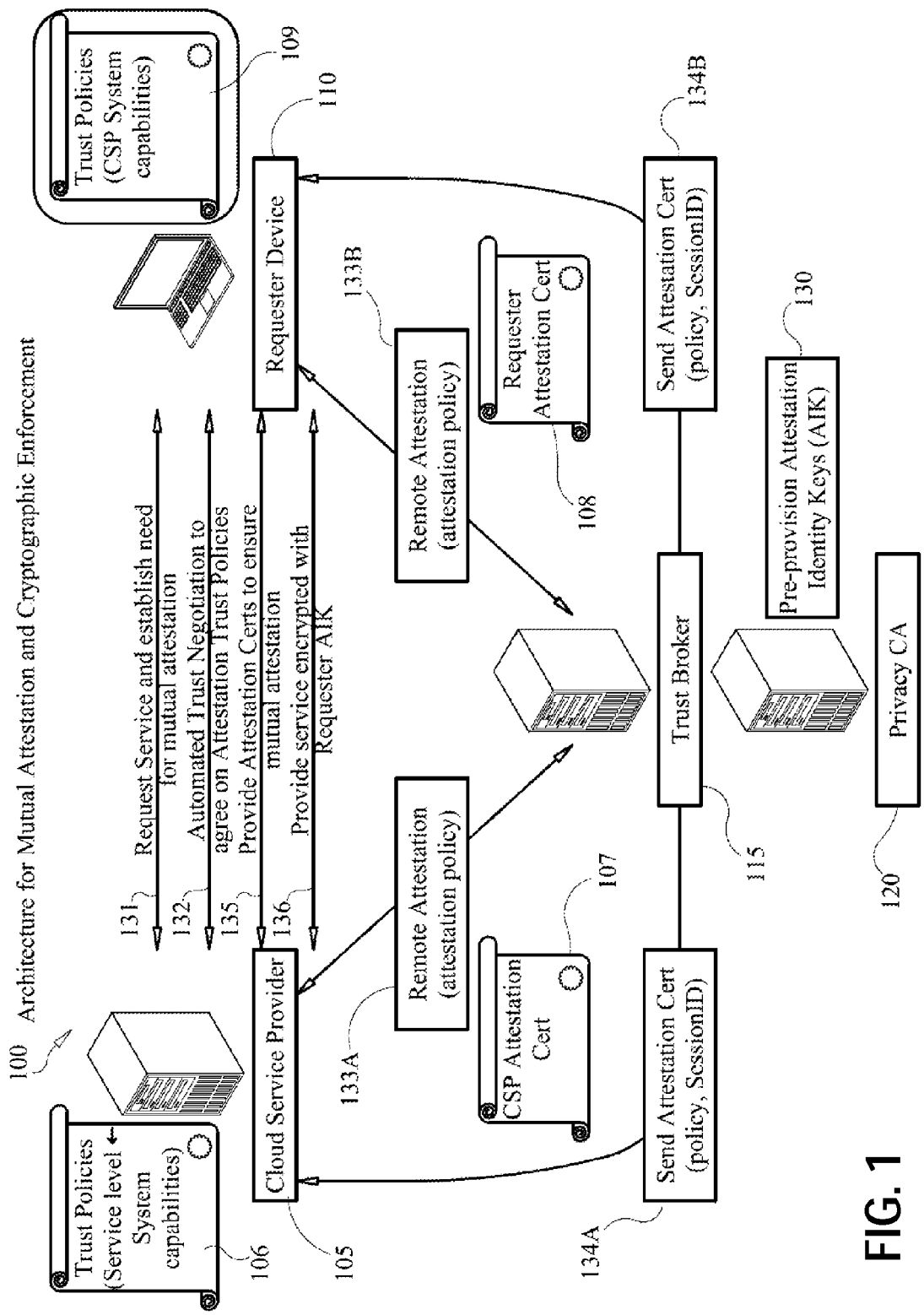
FIG. 1 illustrates an exemplary architecture in accordance with which embodiments may operate.

Described herein are systems, apparatuses, and methods for implementing cryptographic enforcement based on mutual attestation for cloud services. For example, when devices want to participate in a cloud service, conventional mechanisms provide no way for such devices to exchange information to ensure that all the devices are trustworthy, including devices of the service provider(s) and also requesting device(s) seeking services from the service provider(s). The embodiments described herein provide mechanisms for cryptographically enforcing a mutual trust relationship by denying access to the service if either device is compromised, regardless of whether the compromised device is characterized as a service provider device or a requesting device (e.g., client) of such services.

In the event of attestation failure, cryptographic enforcement means described herein will result in the loss of keying material required for enabling the devices to receive or transmit encrypted material. The cryptographic key(s) generated may be for the server, or for the client, or for both the server and the client. For instance, in some embodiments, client keys are generated such that the client may access an encrypted payload coming from the server. In additional or alternative embodiments, cryptographic key(s) generated may be for the server, so as to allow the client to encrypt a package which is consumable by or stored at the service provider, in which the cryptographic key(s) generated for the server enable the server to receive, decrypt, and appropriately handle or store an encrypted payload coming from the client. In yet further embodiments, mutual attestation further enables two end points to operate in a peer-to-peer type relationship rather than that of a server/client. For instance, two client devices having both successfully mutually attested with a trust broker may exchange information between one another, or two server devices having both successfully mutually attested with a trust broker may exchange information between one another as peers on the server side.

According to one exemplary embodiment, means for implementing cryptographic enforcement based on mutual attestation for cloud services may include receiving, at the service provider, a request from a client, the request being for services from the service provider to the client; sending to a trust broker, from the service provider, a trust policy of the service provider against which trustworthiness attributes and capabilities of both the service provider and the client are to be evaluated by the trust broker; receiving, at the service provider, a certificate from the trust broker attesting to compliance of the service provider with the trust policy; sending the certificate from the service provider to the client for affirming mutual attestation of both the service provider and the client in compliance with the trust policy according to evaluation by the trust broker; establishing a connection between the service provider and the client for the service provider to render the requested services to the client; and encrypting information exchanged between the service provider and the client in fulfillment of the request for services from the client.

According to described embodiments, once devices on both the service provider side and the client side are evaluated by a remote trust broker, a unique cryptographic token is used by each respective device to securely interact with the other device having been successfully validated by the remote trust broker. The interactions are encrypted via the unique cryptographic token and the other device having also provided the remote attestation information is enabled to unwrap the token provided by the remote trust broker. Only the known trusted devices having successfully completed mutual attestation are able to unwrap the new cryptographic keys or "tokens," and based only on the information that the original devices provided to the trust broker as part of the requested trust evaluation, for instance, by unwrapping the new cryptographic keys or "tokens," using a private key utilized by such devices during the mutual remote attestation process.

As increasing amount of data and services move into the cloud, there is an increasing need to ensure secure access to such data and services. It is not sufficient to merely verify that a known user identity and matching password be authenticated with a known list. While such a scheme can be an important aspect of providing security, user/password authentication mechanisms alone cannot protect against the myriad of other risks now perpetrated against users and providers of cloud services. Improved security attestation using cryptographic assurance trust may improve security and trusted computing, especially in a cloud computing environment, over that which is available in the conventional arts.

Conventional means provide no mechanism by which to ensure that both client devices and server side or service provider devices are each subject to cryptographic mutual attestation so as to ensure a secure computing interaction between both the client and server side devices. Such cryptographic mutual attestation may aid to avoid malware on either the server or the client, should one of the devices be subjected to malicious, mimicked, or fake operating system upgrade services which are able to cause systems to erroneously "upgrade" themselves with patches and security updates which are, in reality, infected carriers of malware, similar in principle to a Trojan horse.

Such cryptographic mutual attestation may be considered essential in high assurance systems, such as those dealing with especially sensitive data, for instance, in military and healthcare computing environments, as well as potentially many others where security and privacy considerations are paramount. With respect to healthcare and military considerations specifically, such service providers will have possession of highly valued information, and the users or clients of such services will also have high value information, in addition to exchanging high valued information via, in many cases, a publicly accessible Internet. Therefore, it is desirable to know with certainty that the information provided by the client is being sent to a valid an appropriate server, and when requests are received by such a server, it is again desirable to know with certainty that the information is being provided to a valid requester.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled with a computer system bus. The term "coupled" may refer to two or more elements which are in direct contact (physically, electrically, magnetically, optically, etc.) or to two or more elements that are not in direct contact with each other, but still cooperate and/or interact with each other.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 illustrates an exemplary architecture 100 in accordance with which embodiments may operate. In accordance with the described embodiments, an exemplary architecture 100 for mutual attestation and cryptographic enforcement is shown.

According to such an embodiment, architecture 100 provides a cloud service provider 105 device having therein trust policies 106 (e.g., service level system capabilities, requirements, etc.) which is communicably interfaced to an exemplary client device, such as the requester device 110 having therein trust policies 109 (e.g., Cloud Service Provider ("CSP" system specified capabilities, etc.).

Each of cloud service provider 105 and requester device 110 are further communicably interfaced with a trust broker 115 which facilitates remote attestation 133A and 133B with the cloud service provider 105 and the requester device 110 respectively according to attestation policy, for instance, through the exchange of the CSP attestation certificate 107 from the trust broker 115 to the cloud service provider 105 responsive to an attestation request from the cloud service provider 105; and the complementary exchange of requester attestation certificate 108 from the trust broker 115 to the requester device 110 responsive to a requester attestation request. Trust broker 115 is further communicatively interfaced with privacy certificate authority (CA) 120.

Elements 130 through 136 depict an exemplary flow and series of interactions between the depicted entities. Initially, a privacy certificate authority 120 may be pre-provisioned with Attestation Identity Keys (AIK) at element 130. Such a pre-provisioning element 130, however, is not required for each occurrence of mutual attestation and cryptographic enforcement.

Requester device 110 requests access and establishes or triggers the need for mutual attestation (e.g., 131). Hardware at the cloud service provider 105 which may be one or more individual computing hardware devices then triggers automated trust negotiation to agree upon attestation trust policies (e.g., element 132). Next, trust broker 115 evaluates the capabilities of the cloud service provider's 105 device(s) as depicted by remote attestation 133A according to the requisite attestation policy. If remote attestation 133A is successful with the cloud service provider 105, then trust broker 115 responsively returns a token (e.g., requester attestation certificate 107) to the cloud service provider 105 by sending the attestation certificate 107 at element 134A (e.g., sending a policy, SessionID, etc.) back to the cloud service provider 105 as depicted.

The trust broker 115 further provides remote attestation 133B according to the requisite attestation policy with the requester device. If remote attestation 133B is successful with the requester device 110, then trust broker 115 responsively returns a token (e.g., requester attestation certificate 108) to the requester device 110 by sending the attestation certificate 108 at element 134B (e.g., sending a policy, SessionID, etc.) back to the requester device 110 as depicted.

According to described embodiments, device attestation must be conducted successfully for each service request made by a client to the service provider, according to the trust policy of the service provider. For instance, the service provider may establish such a requirement through the trust policy of the service provider requiring that the client and service provider share cryptographic keys or tokens that allow only the trusted devices to communicate securely, in which the trusted devices are known to be trusted devices by virtue of having successfully conducted mutual attestation via the trust broker in accordance with the trust policy of the service provider. In certain embodiments, the service provider may have already been successfully evaluated at an earlier time by the trust broker, and thus, may already possess a cryptographic key or token that supports the required cryptographic enforcement. Such a cryptographic key or token may be a group key. And in which case, it is the client that must also mutually attest, via the trust broker, to its adherence and compliance with the trust policy of the service provider, so that it too may be elevated to a trusted status, and enforce the encryption requirement necessary to engage the requested service of the service provider.

There are two at least options for the cloud service provider 105 and the requester device 110 to establish service according to the remote attestation 133A-B policies. For instance, a first option may be to engage in automated trust negotiation to agree on the minimal attestation trust policies required for the mutual attestation. A second option may be in which both the cloud service provider 105 and the requester device 110 define policies based on assurance levels that each specifies as the minimum acceptable level, which are then provided to the trust broker 115 so that it may cooperatively work with each of the cloud service provider 105 and the requester device 110 to perform the requisite remote attestation 133A-B pursuant to the demands of each entity. In such a way, the cloud service provider 105 and the requester device 110 may each separately attest to their device capabilities to the trust broker 115 for evaluation as well as specify the required device capabilities which must be attested to the trust broker by the other entity. So long as the trust broker 115 determines the evaluations to be successful, appropriate attestation certificates 107 and 108 will be returned by the trust broker 115 to the cloud service provider 105 and to the requester device 110 thus enabling a connection to be made so as to provide and utilize the requested service.

At element 135 the cloud service provider 105 provides its own reply to the requester device 110 with a validated token to ensure mutual attestation among the cloud service provider 105 and the requester device 110 has occurred, thus completing the mutual attestation mechanism.

At element 136, the cloud service provider 105 provides service encrypted with a requester Attestation Identity Key (AIK) to the requester device. Notably, the validated token utilized to provide service is cryptographically bound to the attestation that took place between the cloud service provider 105 and the particular requester device 110 having requested the service at element 131, resulting in the triggering and completion of the mutual attesting and cryptographic enforcement mechanism described.

There are at least two options for the cloud service provider 105 to use the Attestation Identity Key (AIK). First, the cloud service provider 105 may utilize the AIK used by the requester device 110 to encrypt the data package being provided as a service between the cloud service provider 105 and requester device 110. Or secondly, the cloud service provider 105 may utilize a cryptographic key generated by the trust broker 115 to provide service, for example, by employing hardware keys supported by a Protected Audio Video Path (PAVP) compatible verifier and circuitry, or other such verifier capable features, in which devices on the service or client side that are participating in the mutual attestation are enabled to uniquely unwrap the key thus allowing non-repudiation.

The devices constituting the requester device 110 and/or those devices of the cloud service provider 105 may utilize, by way of example only, any one or more of: a Trusted Platform Module (TPM), a Trusted eXecution Technology (TXT) compatible attestation verifier such as a TXT validator, a cryptographic component signed by an Enhanced Privacy ID (EPID), a Protected Audio Video Path (PAVP) compatible verifier and circuitry, an Intel® Identity Protection Technology (IPT) compatible verifier and circuitry including use of One Time Password (OTP) and Platform Embedded Asymmetrical Token (PEAT) capabilities, etc., so as to establish trust in compliance with the requisite remote attestation 133A-B facilitated by the trust broker 115.

Changes to devices having participated in the mutual attestation will require that those devices to once again carry out the attestation process, to re-attest that they conform to the trust policies dictated. Depending on the policy, the need for a re-attestation may be triggered by, for example, timing on the device, such that a change in processing load or a reboot may trigger the need for re-attestation, or based on software levels, hardware components present in the system, patches, firmware, etc.

The AIK key described above is never viewed in clear text, and it never leaves the platform. The certificate generated is bound to the AIK key with the certificate itself stating that the device in question possesses all of the requisite attributes as per the evaluation against the trust policy by the trust broker 115.

The AIK key itself cannot be traded or exchanged between other devices because it is an inherent part of the system, having been installed within a hardware component of the system or established at pre-provisioning element 130. In certain embodiments, the certificate depends upon a hardware based key.

Thus, the described mechanism ensures that any devices having agreed to participate in the available services have a certificate from the trust broker 115 which is based on the qualification and assessment of the respective devices themselves, and moreover, if there is a sufficient change to the client, the service provider, or both, then that certificate will rendered invalid through local intelligence on such devices checking the continued veracity of the certificate, once obtained, according to the policy requirements, as well as other events, including expiration triggers.

In another embodiment, a cloud authority or trust authority acting as the trust broker 115 having provided such a credential could revoke the credential if a global problem becomes known that requires revocation or the local device itself may become aware of the global problem, for instance having been notified by the trust broker, thus causing the client to invalidate the credential.

It is not necessary that communications of such services be provided between a client as the requester and a server as the cloud service provider. Rather, communication of services may feasibly be between server-to-server relationships, client-to-client relationships, telco-to multiple clients, etc. For example, while a healthcare worker may feasibly intake a healthcare patient and then request electronic medical records (EMRs) from a server acting as the cloud service provider, it is equally feasible that a healthcare worker, such as a doctor, already in possession of a patient's EMR records, may exchange the information with another client device belonging to yet another doctor, thus forming a client-to-client relationship, rather than a more typical client-to-server type relationship.

Regardless of the respective roles of two devices, they may nevertheless engage in mutual attestation as facilitated by a remote trust broker which evaluates each against relevant trust policies and then returns appropriate certificates so that the entities in question may then establish cryptographically enforced communications for carrying out the requested services, such as the retrieval, sending, or exchange of information.

Figure 2A:
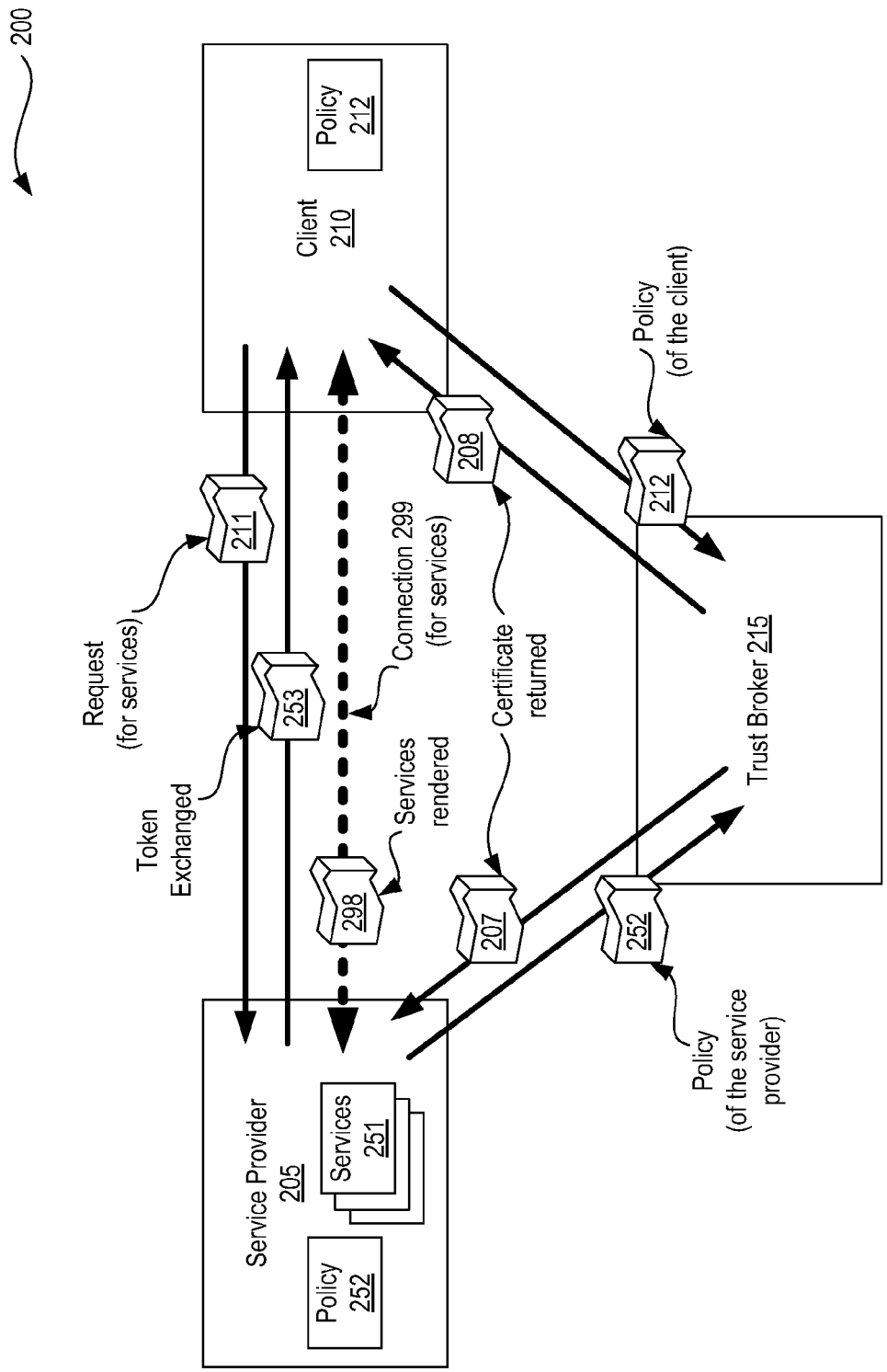
FIG. 2A illustrates an alternative exemplary architecture in accordance with which embodiments may operate.

FIG. 2A illustrates an alternative exemplary architecture 200 in accordance with which embodiments may operate. In this embodiment, there are a service provider 205, a client 210, and a trust broker 215.

As depicted, the client 210 initially triggers a mutual attestation process by sending a request 211 to the service provider 205 for one of the potentially many services 251 offered by the service provider 205. In this embodiment, the client 210 sends its policy 212 to the trust broker 215 and the service provider 205 also sends its policy 252 to the trust broker 215. For instance, both the service provider 205 and the client 210 may define policies 212 (policy of the client) and 252 (policy of the service provider) based on assurance levels that each specifies as the minimum acceptable level, which are then provided to the trust broker 215 so that it may cooperatively work with each of the service provider 205 and the client 210 to perform the requisite remote attestation pursuant to the demands of each entity.

In alternative embodiments, only the service provider sends its policy 252 to the trust broker against which both the service provider 205 and the client 210 are evaluated.

In still other embodiments, the trust broker 215 may dictate a base or default level policy against both the service provider 205 and the client 210, and against which both entities are evaluated by the trust broker 215.

After receiving the respective policies 212 and 252, the trust broker 215 evaluates device capabilities of each of the service provider 205 and the client 210 against the respective policies 212 and 252 of the other. If the trust broker 215 determines the evaluation to be successful, then appropriate attestation certificates 207 and 208 are returned by the trust broker 215 to each of the service provider 205 and the client 210, thus enabling a connection 299 to be made so as to provide and utilize the service requested 211.

The service provider 205 then sends its own reply to the client 210 with a validated token. The token exchanged 253 ensures mutual attestation among the service provider 205 and the client 210 thus completing the mutual attestation.

Once mutual attestation is complete, services are rendered 298 as depicted along the newly established connection 299 for providing such services. Such services may be encrypted as described above with regard to FIG. 1 using, for example, an Attestation Identity Key (AIK) sent from the service provider 205 to the client 210 bound to the preceding attestation performance of the service provider 205 and client 210 with the trust broker 215.

As noted previously, security solutions offered by conventional mechanisms fail to address the problem of ensuring that all members participating in the trusted cloud services are trusted devices, including service providers 205 and the clients 210 which request such services.

There is further a lack of cryptographically enforce policies mandated by the service provider 205 and clients 210, thus ensuring that services are rendered 298 to only between attested systems on both the client and server side of the relationship.

Thus, it is in accordance with certain embodiments that all devices are required to have not only a required trust level, but further that an attested to level of trust is enforced through the requirement of hardware using an exchanged token 253 to manage the security of the services being provided. In the described embodiments, a cryptographic key is generated responsive to successful remote attestation to ensure that only mutually attested systems can access the secure services.

In the policies noted above, such as the policy 252 of the service provider 205, the policy 212 of the client 210, or the trust policies 106 and 109 from FIG. 1, it may be mandated by the respective parties that participating devices on the client or server side adhere to minimal hardware requirements, patch levels, operating systems, or other platform attributes and circuitry, such as TXT, TPM, EPID, etc., so as to ensure an acceptable level of trustworthiness amongst the participants.

Specification of system capabilities via the mandated attestation policies in combination with the methodologies described herein to negotiate and enforce such policies provide a total system's ability to operate in compliance with specified platform trust levels and cryptographically enforced communications utilizing the noted tokens, keys, etc.

Moreover, the cryptographic key generation for use in providing encrypted communications is made possible by extending the remote attestation capabilities to include mutual attestation, and allowing appropriate tokens to be exchanged before the requested services are communicated between the parties, resulting in a high assurance identification of device capabilities and enforcement of requirements as is now desirable in certain computing environments, such as military, healthcare, telecommunication operators, banks and other financial institutions, Video Conference providers, secure document providers, and so forth.

Figure 2B:
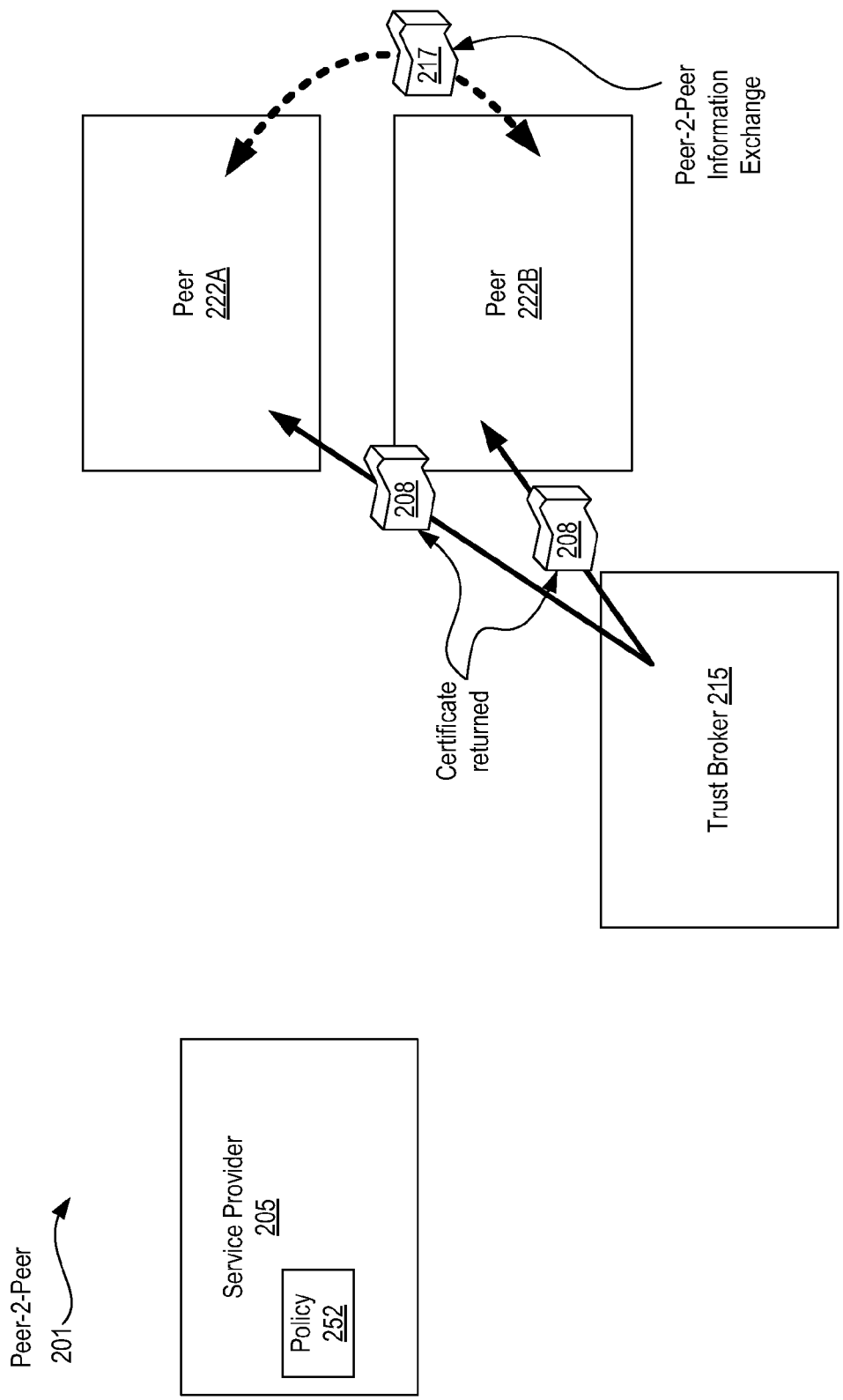
FIG. 2B illustrates an alternative exemplary architecture in accordance with which embodiments may operate.

FIG. 2B illustrates an alternative exemplary architecture 201 in accordance with which embodiments may operate. In this embodiment, there is a service provider 205 and a trust broker 215 as before, however, the exchange of services is represented by the peer-2-peer information exchange 217 between peer 222A and peer 222B.

In this exemplary embodiment, there is no direct interaction with the service provider 205 with regard to the information being exchanged. Rather, it is merely a peer to peer relationship. For instance, two military client devices may operate as peer nodes, each of which interact in a peer-2-peer information exchange 217 between a first peer 222A and a second peer 222B. In such an example, mutual attestation and enforcement of an encryption requirement according to policy 252 may nevertheless be enforced, as each of the respective peers 222A-B must still attest with the trust broker 215 and have an appropriate requester certificate 208 returned.

Figure 2C:
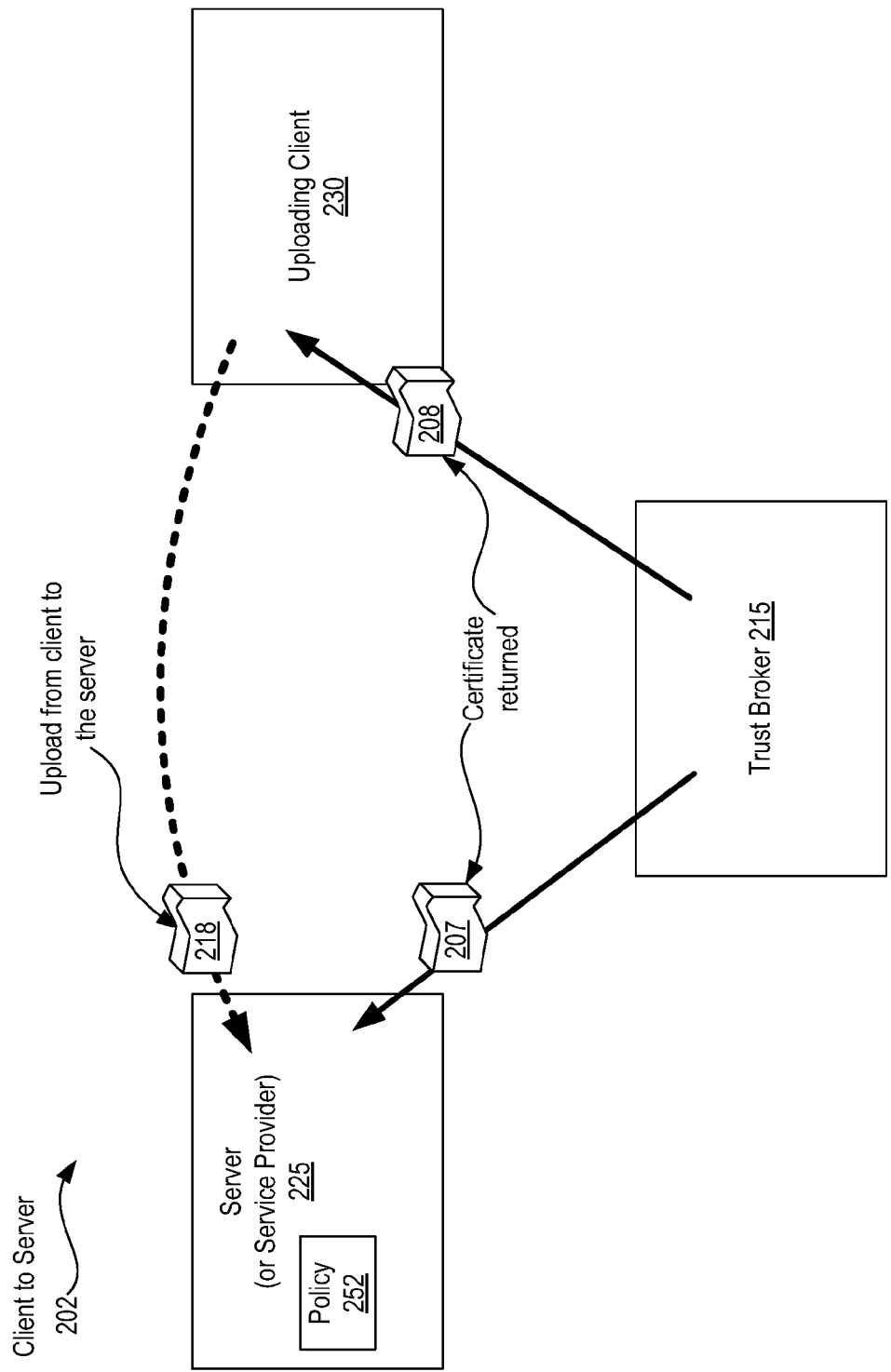
FIG. 2C illustrates an alternative exemplary architecture in accordance with which embodiments may operate.

FIG. 2C illustrates an alternative exemplary architecture 202 in accordance with which embodiments may operate. In this embodiment, there are a server 225 (or a service provider) and a trust broker 215. There is additionally a client device depicted here as the uploading client 230. In this exemplary embodiment, however, the exchange of services is represented by the upload from the client to the serer 218 information exchange in which information is in the possession of the uploading client 230 and is being submitted or stored with the remote server 225 (or service provider).

Although still a relationship between a client and a server, in this instance, it is not the server 225 itself which possesses the highly valued information, but rather, is the uploading client 230 which possesses such information and which must have some assurance that it is presenting and uploading its information to a trusted and appropriate depository. For instance, a military client device or a medical doctor's client device may operate as a remote client node and fulfill the role of an uploading client 230 which uploads high value information from the client to the server 218. In such an example, mutual attestation and enforcement of an encryption requirement according to policy 252 may nevertheless be enforced, as each of the respective server 225 and uploading client 230 must still attest with the trust broker 215 and have an appropriate requester certificate 207-208 returned. Regardless of the relationship between two devices, the trust broker 215 facilitates mutual attestation of such devices by evaluating such devices for compliance with stated policy, such as a service provider dictated policy 252, regardless of whether or not the service provider itself is participating in the particular exchange or not. In such a way, the methodologies provided for cryptographic enforcement based on mutual attestation for cloud services ensures better user control and can further play a critical role in preserving user data privacy.

Figure 2D:
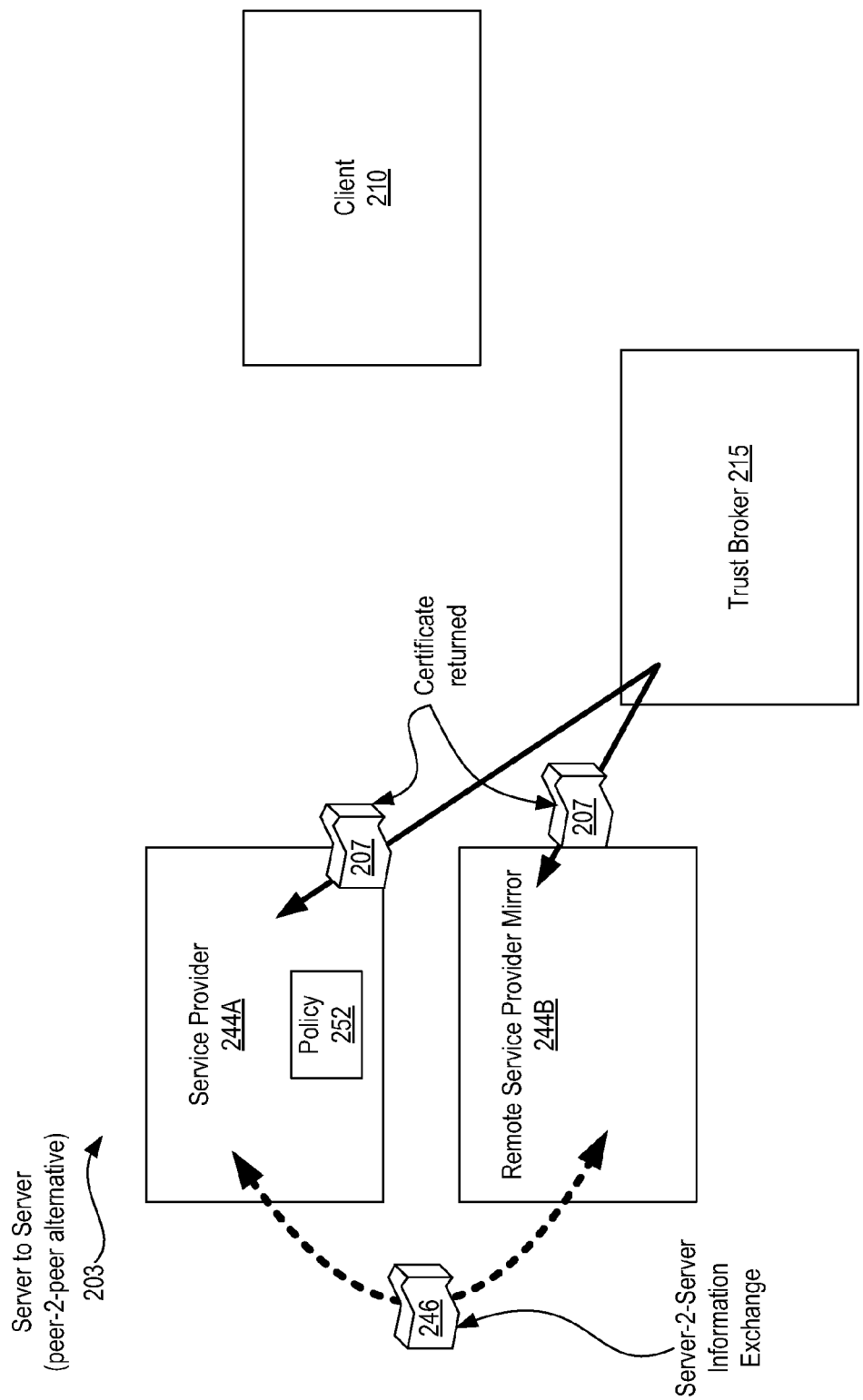
FIG. 2D illustrates an alternative exemplary architecture in accordance with which embodiments may operate.

FIG. 2D illustrates an alternative exemplary architecture 203 in accordance with which embodiments may operate. In this embodiment, there is a client 210 and a trust broker 215 as in prior examples, however, the exchange of services is represented by the server-2-server information exchange 246 between service provider 244A and the remote service provider mirror 244B. In such an embodiment, the two service providers 244A-B represent a peer-2-peer alternative as each functions in peer roles, that is, each is a server or a service provider, and yet they exchange information with one another via the server-2-serer information exchange 246 process depicted.

In this exemplary embodiment, there is no direct interaction from either of the service providers 244A-B with the client 210 as in a more typical client/server relationship or exchange, though there may be at other times. Rather, the two service providers 244A-B establish a server side peer based relationship for communicating high value information between one another, such as to establish a mirror or redundant node, etc. For instance, in a healthcare Electronic Medical Record (EMR) storage environment, one hospital may wish to create its own local service provider storage repository node from a master which is maintained and controlled by an outside service provider. Thus, a cloud service provider may operate and manage the service provider 244A which may operate as the master in such an exemplary embodiment, and the remote service provider mirror 244B may be established as a mirror node at a local hospital, remote from the primary and master device represented by 244A. In such an embodiment, each of the service providers 244A-B may possess and retain highly valued information which must be exchanged and synched between one another, without regard to any particular clients that may interact with the service provider 244A-B devices at different times. Thus, in such an embodiment, mutual attestation and enforcement of an encryption requirement according to policy 252 may nevertheless be enforced, as each of the respective service providers 244A-B must still attest with the trust broker 215 and have an appropriate requester certificate 207 returned. Simply because each device is a service provider 244A-B does not negate the requirement that each mutually attest with the trust broker 215 and enforce the encryption requirement as is described herein.

FIGS. 3, 4, 5, and 6 are flow diagrams illustrating methods 300, 400, 500, and 600 for implementing cryptographic enforcement based on mutual attestation for cloud services. Methods 300, 400, 500, and 600, may be performed by processing logic that may include hardware (e.g., circuitry, dedicated logic, programmable logic, microcode, etc.), including that of a client, service provider, trust broker, or a privacy certificate authority as previously described. The numbering of the blocks presented is for the sake of clarity and is not intended to prescribe an order of operations in which the various blocks must occur.

With reference to FIG. 3 specifically, method 300 illustrates means for implementing cryptographic enforcement based on mutual attestation for cloud services in the perspective of a service provider or a server side device which provides services to a client.

At block 305, processing logic receives, at a service provider, a request from a client, the request being for services from the service provider to the client.

At block 310, processing logic sends to a trust broker, from the service provider, a trust policy of the service provider against which trustworthiness attributes and capabilities of both the service provider and the client are to be evaluated by the trust broker.

At block 315, processing logic receives, at the service provider, a certificate from the trust broker attesting to compliance of the service provider with the trust policy.

At block 320, processing logic sends a key bound token or certificate from the service provider to the client for affirming mutual attestation of both the service provider and the client in compliance with the trust policy according to evaluation by the trust broker.

At block 325, processing logic establishes a connection between the service provider and the client for the service provider to render the requested services to the client.

At block 330, processing logic encrypts information exchanged between the service provider and the client via a hardware based key in fulfillment of the request for services from the client.

Flow then ends or iterates as necessary.

Figure 4:
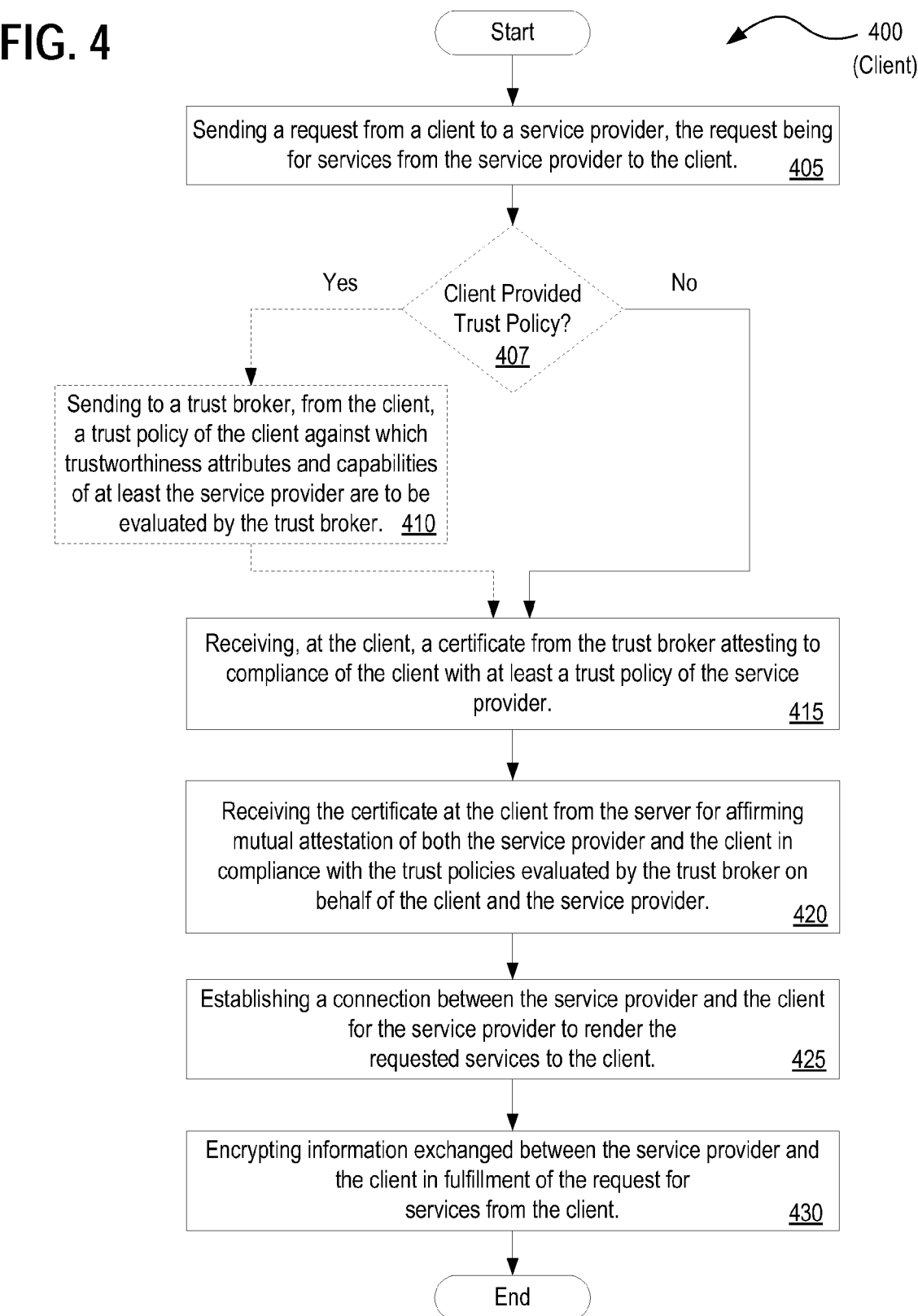

With reference to FIG. 4 specifically, method 400 illustrates means for implementing cryptographic enforcement based on mutual attestation for cloud services in the perspective of a client or requester device for services from a service provider.

At block 405, processing logic sends a request from a client to a service provider, the request being for services from the service provider to the client.

At decision point 407, it is determined whether the client provides a trust policy of its own, or whether the client does not provide a trust policy and relies upon the trust policy as set forth by another entity, such as the service provider.

If "yes," the client does provide a trust policy of its own, then flow proceeds from decision point 407 to block 410, where processing logic sends to a trust broker, from the client, a trust policy of the client against which trustworthiness attributes and capabilities of at least the service provider are to be evaluated by the trust broker. After flow 410, flow advances to block 415.

Alternatively, if "no," the client does not provide a trust policy of its own, then flow instead proceeds from decision point 407 directly to block 415.

At block 415, processing logic receives, at the client, a certificate from the trust broker attesting to compliance of the client with at least a trust policy of the service provider.

At block 420, processing logic receives a key bound token or certificate at the client from the server for affirming mutual attestation of both the service provider and the client in compliance with the trust policies evaluated by the trust broker on behalf of the client and the service provider.

At block 425, processing logic establishes a connection between the service provider and the client for the service provider to render the requested services to the client.

At block 430, processing logic encrypts information exchanged between the service provider and the client via a hardware based key in fulfillment of the request for services from the client.

Flow then ends or iterates as necessary.

Figure 5:
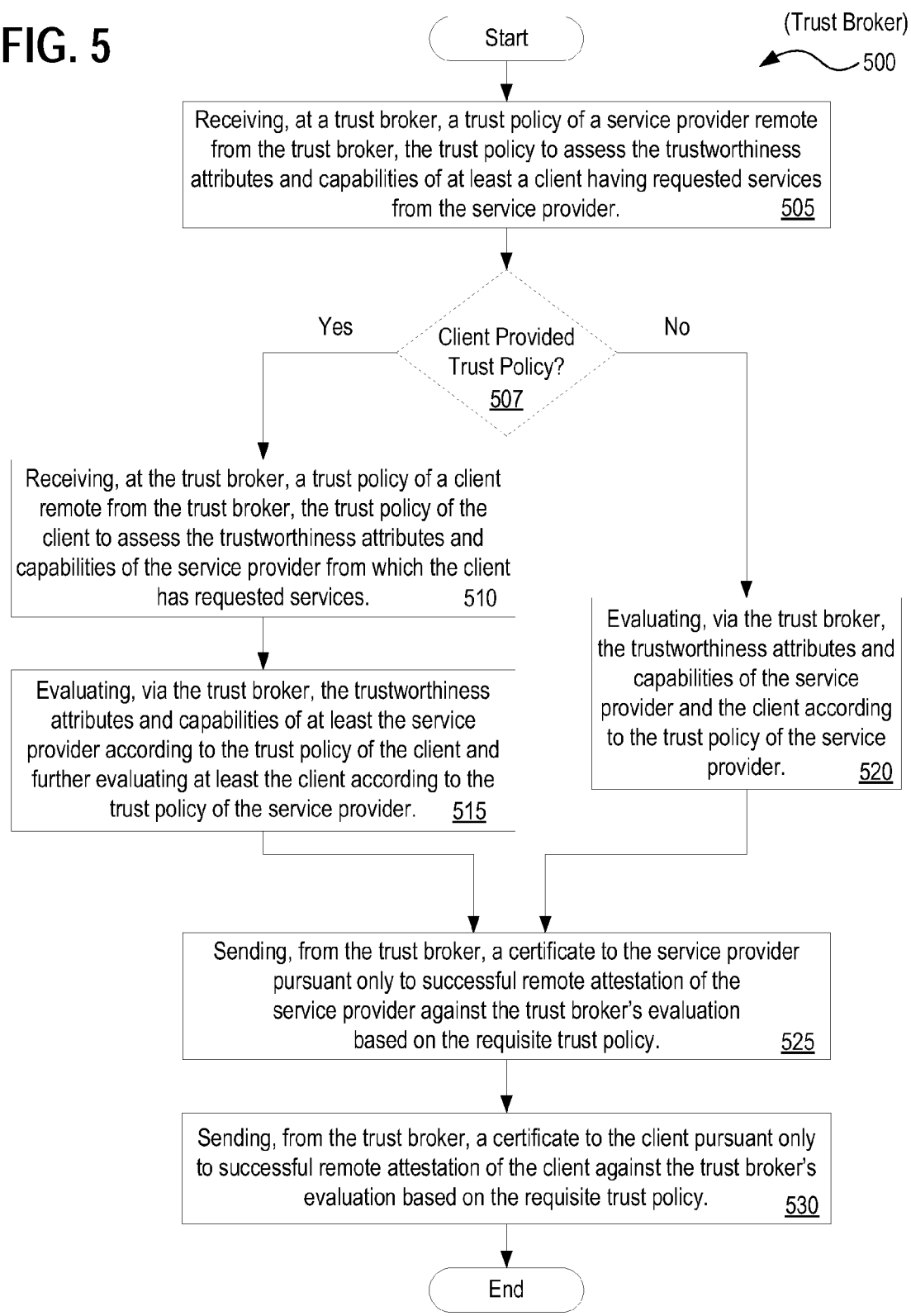

With reference to FIG. 5 specifically, method 500 illustrates means for implementing cryptographic enforcement based on mutual attestation for cloud services in the perspective of a remote trust broker which facilitates mutual attestation on behalf of each of the service provider which provides services and a client device or requester device which requests services from a service provider.

At block 505, processing logic receives, at a trust broker, a trust policy of a service provider remote from the trust broker, the trust policy to assess the trustworthiness attributes and capabilities of at least a client having requested services from the service provider.

At decision point 507, it is determined whether the client provides a trust policy of its own, or whether the client does not provide a trust policy and relies upon the trust policy as set forth by another entity, such as the service provider.

If "yes," the client does provide a trust policy of its own, then flow proceeds from decision point 507 to block 510, where processing logic receives, at the trust broker, a trust policy of a client remote from the trust broker, in which the trust policy of the client is to assess the trustworthiness attributes and capabilities of the service provider from which the client has requested services.

Flow then proceeds in this branch to block 515, where processing logic evaluates, via the trust broker, the trustworthiness attributes and capabilities of the service provider according to the trust policy of the client and further evaluates at least the client according to the trust policy of the service provider. The trust broker may further evaluate the service provider against the trust policy of the service provider and further evaluate the client against the trust policy of the client, in addition to other evaluations of attestation for capabilities and trustworthiness attributes of the respective devices.

Flow then advances to block 525.

Alternatively, if "no," the client does not provide a trust policy of its own, then flow instead proceeds from decision point 507 to block 520, where processing logic evaluates, via the trust broker, the trustworthiness attributes and capabilities of the service provider and the client according to the trust policy of the service provider.

The trust broker may additionally evaluate the trustworthiness attributes and capabilities of the service provider or the client device, or both, according to other trust policies, such as a baseline or default trust policy established by the trust broker, or according to the trust policy provided by the other entity participating in the mutual attestation, or according to the trust policy provided by the same entity participating in the mutual attestation having provided a trust policy.

Flow then advances to block 525.

At block 525, processing logic sends, from the trust broker, a certificate to the service provider pursuant only to successful remote attestation of the service provider against the trust broker's evaluation based on the requisite trust policy. For example, the service provider may be evaluated against the service providers own trust policy, against a trust policy according to the client, and/or against a default or baseline trust policy as provided by the trust broker.

At block 530, processing logic sends, from the trust broker, a certificate to the client pursuant only to successful remote attestation of the client against the trust broker's evaluation based on the requisite trust policy. Similar to the treatment of the service provider, the client device likewise may be evaluated against the client's own trust policy, against a trust policy according to the service provider, and/or against a default or baseline trust policy as provided by the trust broker.

Flow then ends or iterates as necessary.

With reference to FIG. 6 specifically, method 600 illustrates means for cryptographically enforcing a mutual trust relationship for electronic services with a cooperative trust broker on behalf of, for example a client device and a service provider device each participating in a mutual attestation scheme so as to establish mutual trust and enable cryptographically enforced secure communication exchanges.

At block 605, processing logic receives, at a server processing system, from a client processing system, a request for services.

At block 610, processing logic, in response to receiving the request for services, automatically requesting an attestation certificate for the server processing system from a trust broker.

At block 615, processing logic sends the attestation certificate for the server processing system to the client processing system, in which the attestation certificate for the server processing system is signed by the trust broker and cryptographically bound to the server processing system.

At block 620, processing logic receives an attestation certificate for the client processing system from the client processing system, in which the attestation certificate for the client processing system is signed by the trust broker and cryptographically bound to the client processing system.

At block 625, processing logic automatically determines whether the client processing system meets predetermined trust policy criteria for the services, based on the attestation certificate for the client processing system.

At block 630, processing logic provides the requested services to the client processing system only if the client processing system meets the predetermined trust policy criteria for the services.

Flow then ends or iterates as necessary.

According to an alternative embodiment of method 600, the attestation certificate for the server processing system identifies and attests to device capabilities of the server processing system; and the attestation certificate for the client processing system identifies and attests to device capabilities of the client processing system.

According to another embodiment of method 600, the attestation certificate for the server processing system includes a session identifier; the attestation certificate for the client processing system includes a session identifier; and in which the embodiment further includes operations for automatically determining whether the session identifier from the attestation certificate for the client processing system matches the session identifier from the attestation certificate for the server processing system. In such an embodiment, the server processing system provides the requested services to the client processing system only if the session identifier from the attestation certificate for the client processing system matches the session identifier from the attestation certificate for the server processing system.

Figure 7A:
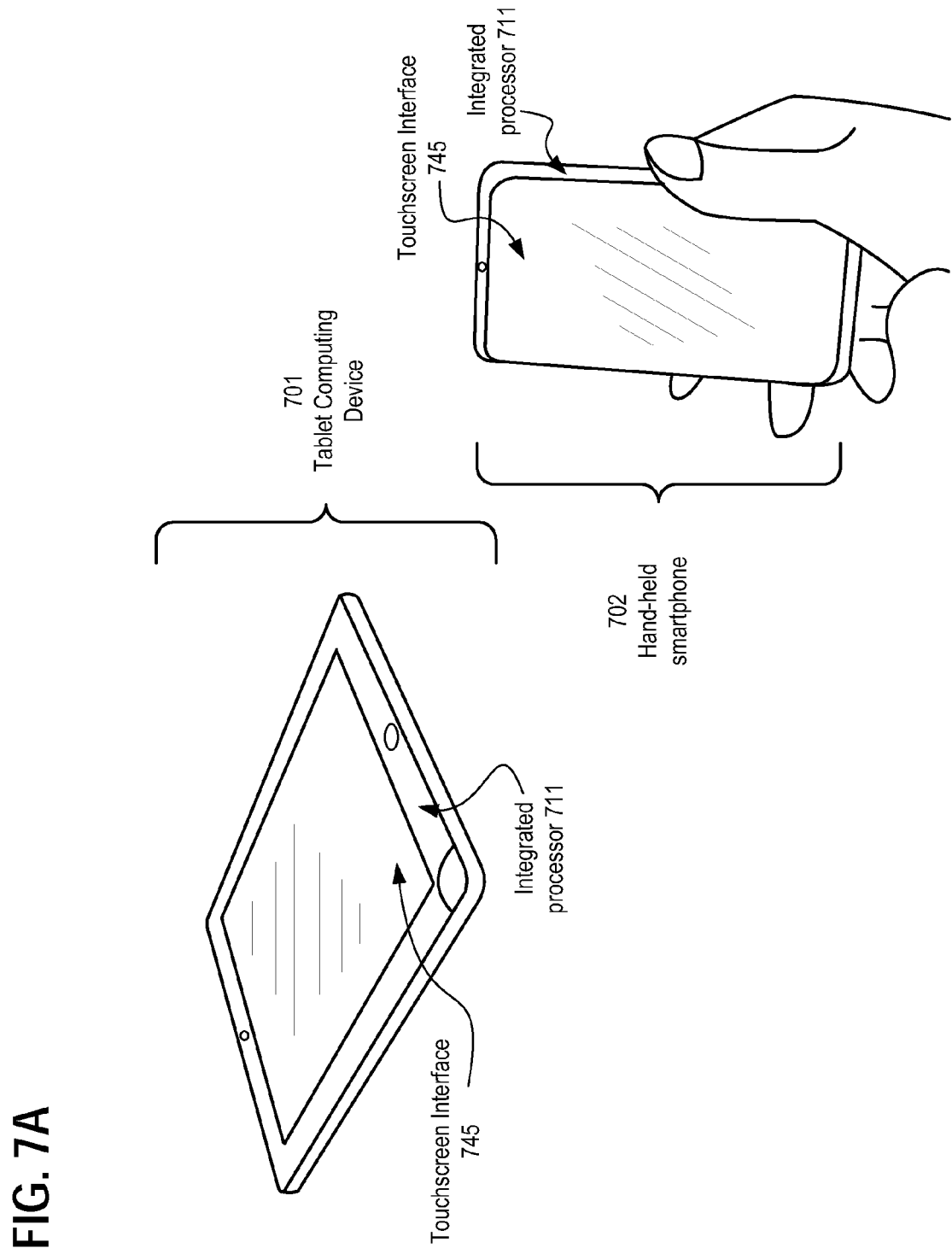
FIG. 7A depicts a tablet computing device and a hand-held smartphone each having a circuitry, components, and functionality integrated therein as described in accordance with the embodiments.

FIG. 7A depicts a tablet computing device 701 and a handheld smartphone 702 each having a circuitry, components, and functionality integrated therein as described in accordance with the embodiments, such as a TPM module a TXT component and other necessary hardware and functionality to request, authenticate, successfully attest as to compliance with a policy of the service provider through an attestation verifier, and then access high assurance services. As depicted, each of the tablet computing device 701 and the hand-held smartphone 702 include a touchscreen interface 745 and an integrated processor 711 in accordance with disclosed embodiments.

For example, in one embodiment, the requester device 110 and client 210 depicted by the preceding figures may be embodied by a tablet computing device 701 or a hand-held smartphone 702, in which a display unit of the apparatus includes the touchscreen interface 745 for the tablet or smartphone and further in which memory and an integrated circuit operating as an integrated processor 711 are incorporated into the tablet or smartphone. In such an embodiment, the integrated processor 711 coordinates techniques for requesting services, authenticating, and attesting according to the techniques described above.

Figure 7B:
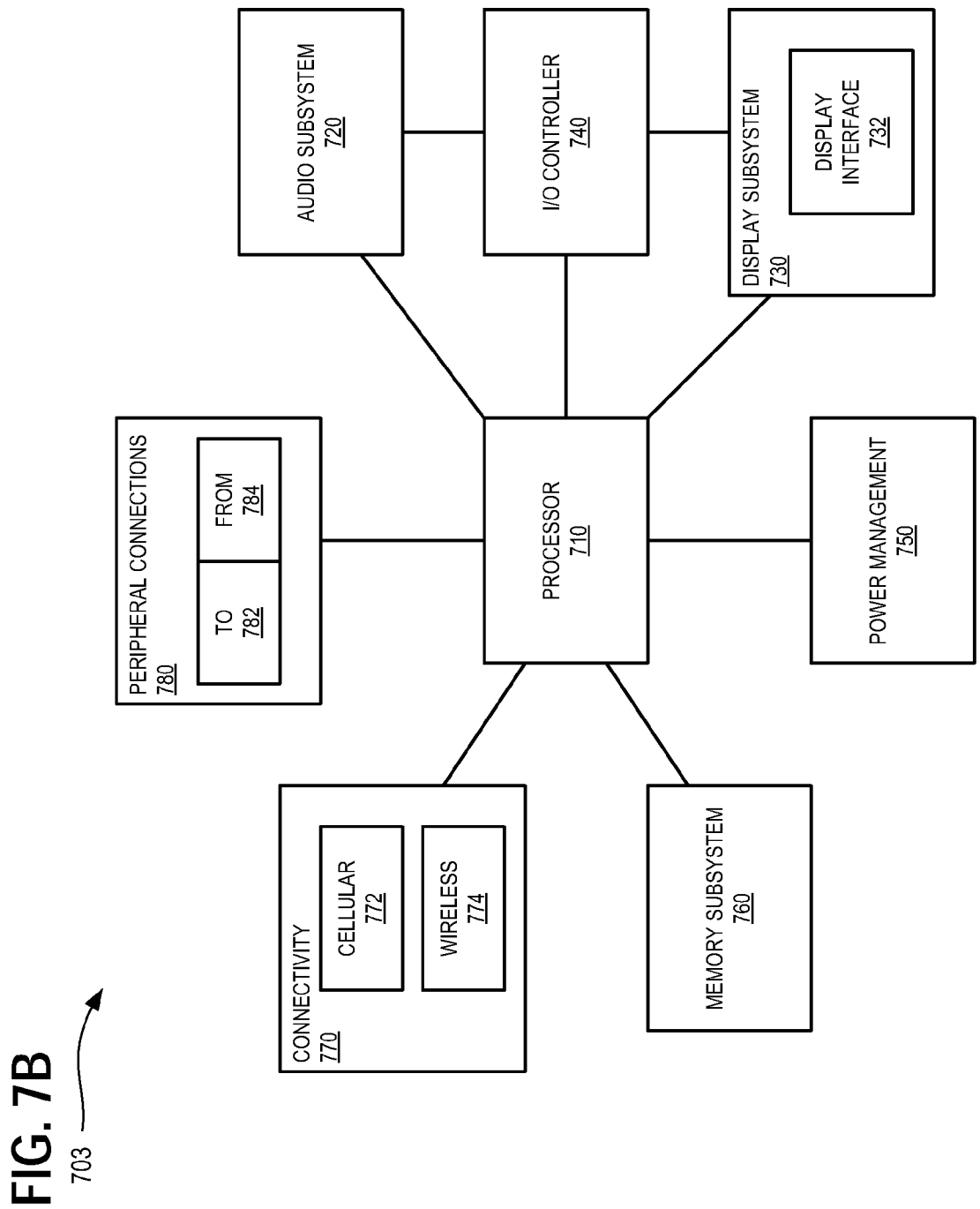
FIG. 7B is a block diagram of an embodiment of tablet computing device, a smart phone, or other mobile device in which touchscreen interface connectors are used.

FIG. 7B is a block diagram 703 of an embodiment of a tablet computing device, a smart phone, or other mobile device in which touchscreen interface connectors are used. Processor 710 performs the primary processing operations. Audio subsystem 720 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 710.

Display subsystem 730 represents hardware (e.g., display devices) and software (e.g., drivers) components that provide a visual and/or tactile display for a user to interact with the tablet computing device or smart phone. Display subsystem 730 includes display interface 732, which includes the particular screen or hardware device used to provide a display to a user. In one embodiment, display subsystem 730 includes a touchscreen device that provides both output and input to a user.

I/O controller 740 represents hardware devices and software components related to interaction with a user. I/O controller 740 can operate to manage hardware that is part of audio subsystem 720 and/or display subsystem 730. Additionally, I/O controller 740 illustrates a connection point for additional devices that connect to the tablet computing device or smart phone through which a user might interact. In one embodiment, I/O controller 740 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 750 that manages battery power usage, charging of the battery, and features related to power saving operation. Memory subsystem 760 includes memory devices for storing information in the tablet computing device or smart phone. Connectivity 770 includes hardware devices (e.g., wireless and/or wired connectors and communication hardware) and software components (e.g., drivers, protocol stacks) to the tablet computing device or smart phone to communicate with external devices. Cellular connectivity 772 may include, for example, wireless carriers such as GSM (global system for mobile communications), CDMA (code division multiple access), TDM (time division multiplexing), or other cellular service standards). Wireless connectivity 774 may include, for example, activity that is not cellular, such as personal area networks (e.g., Bluetooth), local area networks (e.g., WiFi), and/or wide area networks (e.g., WiMax), or other wireless communication.

Peripheral connections 780 include hardware interfaces and connectors, as well as software components (e.g., drivers, protocol stacks) to make peripheral connections as a peripheral device ("to" 782) to other computing devices, as well as have peripheral devices ("from" 784) connected to the tablet computing device or smart phone, including, for example, a "docking" connector to connect with other computing devices. Peripheral connections 780 include common or standards-based connectors, such as a Universal Serial Bus (USB) connector, DisplayPort including MiniDisplayPort (MDP), High Definition Multimedia Interface (HDMI), Firewire, etc.

Figure 8:
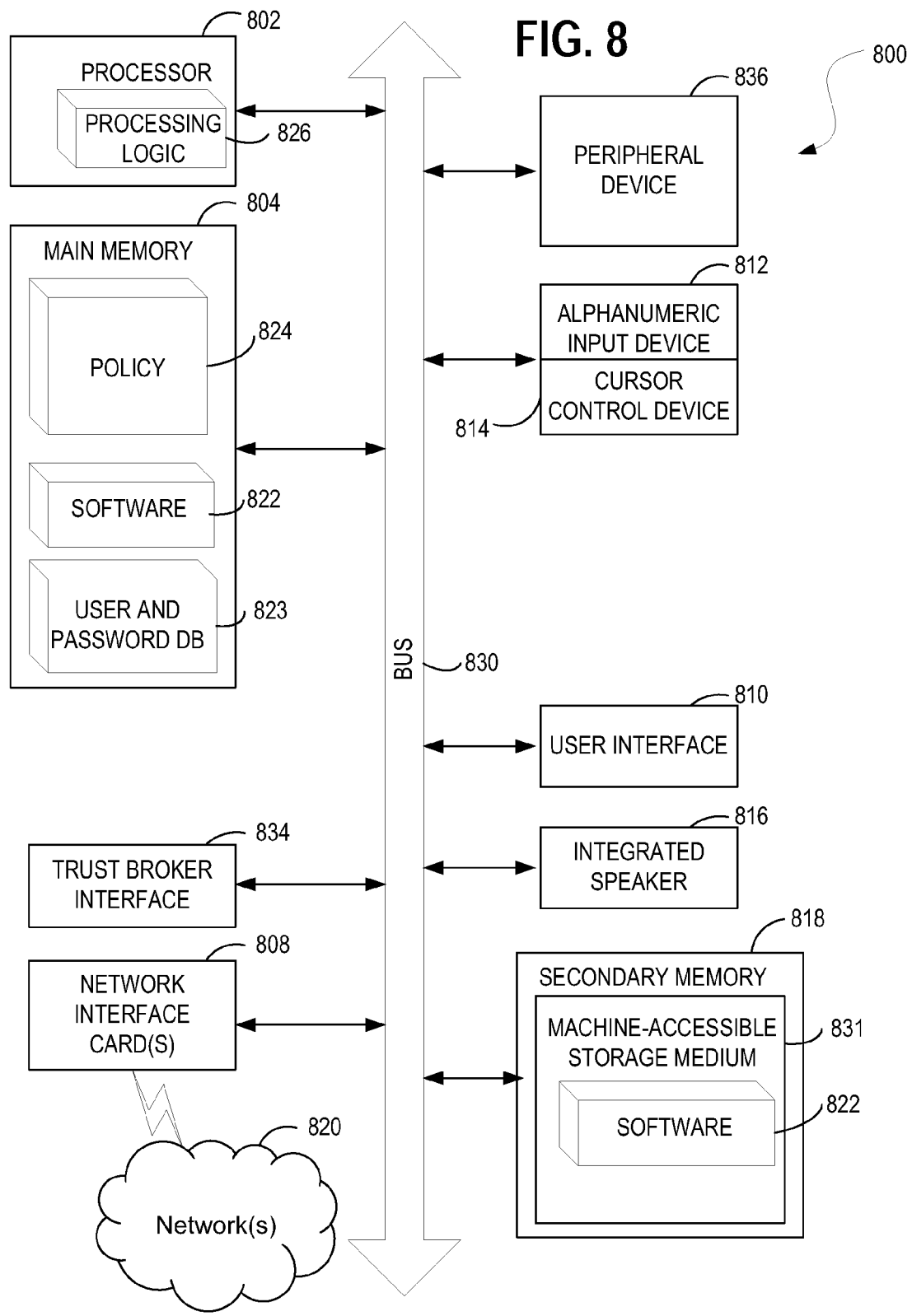
FIG. 8 illustrates a diagrammatic representation of a machine in the exemplary form of a computer system, in accordance with one embodiment.

FIG. 8 illustrates a diagrammatic representation of a machine 800 in the exemplary form of a computer system, in accordance with one embodiment, within which a set of instructions, for causing the machine 800 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer-to-peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and persistent data base implementations), which communicate with each other via a bus 830. Main memory 804 includes information and instructions and software program components necessary for performing and executing the functions with respect to the various embodiments of the systems, methods, and entities as described herein including the client, attestation verifier, upgrade service provider and the service provider. Policy 824 is specified by a service provider, a client device, or a trust broker, and is stored within main memory 804. User and password database 823 may be stored within main memory 804. Main memory 804 and its sub-elements (e.g. 823 and 824) are operable in conjunction with processing logic 826 and/or software 822 and processor 802 to perform the methodologies discussed herein.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and functionality which is discussed herein.

The computer system 800 may further include one or more network interface cards 808 to communicatively interface the computer system 800 with one or more networks 820, such as the Internet or a publicly accessible network. The computer system 800 also may include a user interface 810 (such as a video display unit, a liquid crystal display (LCD), or a cathode ray tube (CRT)), an alphanumeric input device 812 (e.g., a keyboard), a cursor control device 814 (e.g., a mouse), and a signal generation device 816 (e.g., an integrated speaker). The computer system 800 may further include peripheral device 836 (e.g., wireless or wired communication devices, memory devices, storage devices, audio processing devices, video processing devices, etc.). Trust broker interface 834 may be integrated into the exemplary machine 800 so as to enable communication with a trust broker or from a trust broker to remote devices such as those of a service provider, a cloud service provider, a requester device, or a client device, etc.

The secondary memory 818 may include a non-transitory machine-readable storage medium (or more specifically a non-transitory machine-accessible storage medium) 831 on which is stored one or more sets of instructions (e.g., software 822) embodying any one or more of the methodologies or functions described herein. Software 822 may also reside, or alternatively reside within main memory 804, and may further reside completely or at least partially within the processor 802 during execution thereof by the computer system 800, the main memory 804 and the processor 802 also constituting machine-readable storage media. The software 822 may further be transmitted or received over a network 820 via the network interface card 808.

In accordance with the preceding disclosure, the following exemplary embodiments are presented as follows:

According to a first embodiment there is a method at a service provider having the following operations: receiving, at the service provider, a request from a client, the request being for services from the service provider to the client; sending to a trust broker, from the service provider, a trust policy of the service provider against which trustworthiness attributes and capabilities of both the service provider and the client are to be evaluated by the trust broker; receiving, at the service provider, a certificate from the trust broker attesting to compliance of the service provider with the trust policy; sending the certificate from the service provider to the client for affirming mutual attestation of both the service provider and the client in compliance with the trust policy according to evaluation by the trust broker; establishing a connection between the service provider and the client for the service provider to render the requested services to the client; and encrypting information exchanged between the service provider and the client in fulfillment of the request for services from the client.

According to an embodiment of the method, the trustworthiness attributes and capabilities of both the service provider and the client are further to be evaluated by the trust broker in accordance with a trust policy of the service provider; and in which the method further includes: (i) the service provider receiving, the certificate from the trust broker attesting to compliance of the service provider with the trust policy of the service provider; and (ii) a requestor certificate from the trust broker to be evaluated by the client attesting to compliance of the client with the trust policy of the service provider.

According to an embodiment of the method, the trustworthiness attributes and capabilities of the service provider are further to be evaluated by the trust broker in accordance with a trust policy provided by the trust broker and not by the service provider or by the client; and in which the method further includes receiving, at the service provider, the certificate from the trust broker further attesting to compliance of the service provider with the trust policy provided by the trust broker.

According to an embodiment of the method, sending the certificate from the service provider to the client includes: the service provider sending the certificate received from the trust broker to the client, in which the certificate received from the trust broker is signed by the trust broker and bound to the key used by the trust broker to sign the certificate.

According to an embodiment of the method, sending the certificate from the service provider to the client includes: the service provider sending the certificate received from the trust broker to the client, in which the certificate received from the trust broker is signed by the service provider prior to sending to the client and bound to the key used by the service provider to sign the certificate.

According to an embodiment of the method, the service provider signs the certificate received from the trust broker using an Attestation Identity Key (AIK) provided to the service provider by the trust broker with the certificate, and in which the certificate is bound to the AIK used to sign the certificate.

According to an embodiment of the method, sending the certificate from the service provider to the client for affirming mutual attestation of both the service provider and the client in compliance with the trust policy according to evaluation by the trust broker includes: sending the certificate received at the service provider from the trust broker to the client to affirm attestation of the service provider in compliance with the trust policy according to evaluation by the trust broker; and receiving a client certificate from the client, the client certificate having been received at the client from the trust broker, in which the client certificate affirms to the service provider attestation of the client in compliance with the trust policy according to evaluation by the trust broker.

According to an embodiment of the method, encrypting the information exchanged between the service provider and the client via the hardware based key includes: encrypting the information via an Attestation Identity Key (AIK) received from the client, in which the client then utilizes the AIK key to decrypt the encrypted information from the service provider and further to encrypt communications sent to the service provider.

According to an embodiment of the method, encrypting the information exchanged between the service provider and the client via the hardware based key includes: encrypting the information via a cryptographic key generated by the trust broker and received by the service provider from the trust broker subsequent to successful attestation of the service provider in compliance with the trust policy according to evaluation by the trust broker.

According to an embodiment of the method, encrypting the information exchanged between the service provider and the client via the hardware based key further includes: sending the encrypted information to the client, in which the client unwraps a token provided by the trust broker subsequent to successful attestation of the client in compliance with the trust policy according to evaluation by the trust broker, and in which the token is used by the client to decrypt the encrypted information sent by the service provider.

According to an embodiment of the method, sending the certificate from the service provider to the client for affirming mutual attestation of both the service provider and the client in compliance with the trust policy according to evaluation by the trust broker comprises the certificate sent by the service provider being valid only for the unique mutually attested relationship between the service provider and the client, each having successfully completed mutual attestation together with the trust broker for the requested service.

According to an embodiment of the method, further operations include: invalidating the certificate received from the trust broker based on an event unrelated to the client, in which invalidating the certificate terminates the connection between the service provider and the client for the service provider to render the requested services to the client until a subsequent re-attestation by the service provider and the client with the trust broker.

According to an embodiment of the method, further operations include: receiving notification from the trust broker to invalidate the certificate received from the trust broker based on an event unrelated to the client; invalidating the certificate responsive to the notification from the trust broker; and in which invalidating the certificate terminates the connection between the service provider and the client for the service provider to render the requested services to the client until a subsequent re-attestation by the service provider and the client with the trust broker.

According to an embodiment of the method, further operations include: terminating the connection between the service provider and the client for the service provider to render the requested services to the client until a subsequent re-attestation by the service provider and the client with the trust broker responsive to the client invalidating a requester certificate at the client received from the trust broker being utilized for receiving the requested services from the service provider.

According to an embodiment of the method, the client invalidates its requester certificate responsive to one or more of: a certificate expiration event; a reboot event at the client; a session timeout event at the client; a hardware change at the client; a software signature change at the client; a firmware signature change at the client; and a tamper detection event at the client.

According to an embodiment of the method, the client is one of a plurality of known subscribers of the services provided by the service provider; and in which each individual client of the plurality of known subscribers must perform mutual attestation with the service provider via the trust broker to receive a unique requester certificate from the trust broker affirming mutual attestation that both the service provider and that individual client are in compliance with the trust policy according to evaluation by the trust broker; and in which the certificate received at the service provider from the trust broker attesting to compliance of the service provider with the trust policy is unique and specific to that individual client, the certificate received at the service provider from the trust broker being unusable to provide any service to any other one of the plurality of known subscribers besides that individual client.

According to an embodiment of the method, the trust broker is a Trusted eXecution Technology (TXT) compatible attestation verifier to communicate with a first Trusted Platform Module (TPM) integrated with the client's hardware and further to communicate with a second TPM integrated with the service provider's hardware.

According to an embodiment of the method, the trust policy of the service provider requires at least a password generated by an Identity Protection Technology (IPT) compatible hardware component of the client.

According to an embodiment of the method, the trust policy of the service provider requires at least all entities attest adherence to a plurality of hardware and firmware or software requirements as a pre-requisite to rendering the services requested.

According to an embodiment of the method, the service provider is a provider of high assurance services selected from the group including: remote access to health care information; remote access to medical information; remote access to government contract information; remote access to financial services information; remote access to military information; remote access diplomatic information; and remote access to legal documents subject to confidentiality.

According to an embodiment of the method, the provider of high assurance services includes a cloud computing services entity which permits access to private information over a publicly accessible network subject to compliance with a plurality of hardware and firmware or software requirements by a client requesting access.

According to an embodiment of the method, the trust policy of the service provider includes one or more of the following pre-requisites to accessing the service requested: a bios type; a bios revision level; a minimum patch level and minimum revisions for each of a plurality of patches specified by the minimum patch level; a cryptographic component provided to the client from the attestation verifier; a Trusted Platform Module (TPM) integrated with the client's hardware; and a cryptographic component signed by an Enhanced Privacy ID (EPID) compatible component of the client's hardware.

According to an embodiment of the method, the client is embodied within one of a tablet computing device or a smartphone.

There is according to another embodiment, one or more non-transitory machine readable storage medium having instructions stored thereon that, when executed by a processor of a service provider, the instructions cause the service provider to perform operations including: receiving, at the service provider, a request from a client, the request being for services from the service provider to the client; sending to a trust broker, from the service provider, a trust policy of the service provider against which trustworthiness attributes and capabilities of both the service provider and the client are to be evaluated by the trust broker; receiving, at the service provider, a certificate from the trust broker attesting to compliance of the service provider with the trust policy; sending the certificate from the service provider to the client for affirming mutual attestation of both the service provider and the client in compliance with the trust policy according to evaluation by the trust broker; establishing a connection between the service provider and the client for the service provider to render the requested services to the client; and encrypting information exchanged between the service provider and the client in fulfillment of the request for services from the client.

According to another embodiment of the one or more non-transitory computer readable storage media, the service provider is a provider of high assurance services selected from the group including: remote access to health care information; remote access to medical information; remote access to government contract information; remote access to financial services information; remote access to military information; remote access diplomatic information; and remote access to legal documents subject to confidentiality.

According to another embodiment of the one or more non-transitory computer readable storage media, the provider of high assurance services includes a cloud computing services entity which permits access to private information over a publicly accessible network subject to compliance with a plurality of hardware and firmware or software requirements by a client requesting access.

There is according to another embodiment, a system having therein: a trust broker; and a service provider to provide services.

According to such an embodiment of the system: a client of the services provider is to send a request for the services to the service provider, the request triggering a mutual attestation event by the service provider and the client via the trust broker; in which the service provider initiates a request for an attestation certificate from the trust broker responsive to receiving the request for services from the client, in which the trust broker performs mutual attestation of both the service provider and the client by evaluating trustworthiness attributes and capabilities of both the service provider and the client separately, according to a trust policy provided by the service provider, in which the trust broker returns a certificate to the service provider and a requester certificate to the client device, the certificate and the requester certificate affirming mutual attestation of both the service provider and the client in compliance with the trust policy according to evaluation by the trust broker, in which the client is to send the requester certificate returned from the trust broker to the service provider, in which the service provider determines whether the client meets predetermined trust policy criteria for the services, based on the requester certificate sent by client to the service provider, and in which the service provider provides the requested services to the client only if the client meets the predetermined trust policy criteria for the services.

According to an embodiment of the system, the attestation certificate for the service provider identifies and attests to device capabilities of the service provider through the trust broker; and in which the requester certificate for the client identifies and attests to device capabilities of the client processing system through the trust broker.

According to an embodiment of the system, the certificate for the service provider includes a first session identifier; in which the requester certificate for the client processing system includes a second session identifier; in which the service provider further determines whether the session identifier from the requester certificate for the client processing system matches the session identifier from the certificate for the server processing system; and in which the service provider provides the requested services to the client only if the session identifier from the requester certificate for the client matches the session identifier from the certificate for the service provider.

According to an embodiment of the system, the client is embodied within one of a tablet computing device or a smartphone.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a service provider having at least a processor and a memory therein, wherein the method comprises:
   receiving, at the service provider, a request from a client, the request being for services from the service provider to the client;
   sending to a trust broker, from the service provider, a trust policy of the service provider against which trustworthiness attributes and capabilities of both the service provider and the client are to be evaluated by the trust broker;
   receiving, at the service provider, a certificate from the trust broker attesting to compliance of the service provider with the trust policy;
   sending the certificate from the service provider to the client for affirming mutual attestation of both the service provider and the client in compliance with the trust policy according to evaluation by the trust broker;
   establishing a connection between the service provider and the client for the service provider to render the requested services to the client;
   encrypting information exchanged between the service provider and the client in fulfillment of the request for services from the client; and
   wherein the trust broker is a Trusted eXecution Technology (TXT) compatible attestation verifier to communicate with a first Trusted Platform Module (TPM) integrated with the client's hardware and further to communicate with a second TPM integrated with the service provider's hardware.

2. The method of claim 1:
   wherein trustworthiness attributes and capabilities of both the service provider and the client are evaluated by the trust broker in accordance with a trust policy of the service provider; and
   wherein the method further comprises:
   (i) the service provider receiving, the certificate from the trust broker attesting to compliance of the service provider with the trust policy of the service provider; and
   (ii) a requestor certificate from the trust broker to be evaluated by the client attesting to compliance of the client with the trust policy of the service provider.

3. The method of claim 1:
   wherein trustworthiness attributes and capabilities of the service provider are further to be evaluated by the trust broker in accordance with a trust policy provided by the trust broker and not by the service provider or by the client; and
   wherein the method further comprises receiving, at the service provider, the certificate from the trust broker further attesting to compliance of the service provider with the trust policy provided by the trust broker.

4. The method of claim 1, wherein sending the certificate from the service provider to the client comprises:
   the service provider sending the certificate received from the trust broker to the client, wherein the certificate received from the trust broker is signed by the trust broker and bound to the key used by the trust broker to sign the certificate.

5. The method of claim 1, wherein the sending the certificate from the service provider to the client comprises:
   the service provider sending the certificate received from the trust broker to the client, wherein the certificate received from the trust broker is signed by the service provider prior to sending to the client and bound to the key used by the service provider to sign the certificate.

6. The method of claim 1, wherein the service provider signs the certificate received from the trust broker using an Attestation Identity Key (AIK) provided to the service provider by the trust broker with the certificate, and wherein the certificate is bound to the AIK used to sign the certificate.

7. The method of claim 1, wherein sending the certificate from the service provider to the client for affirming mutual attestation of both the service provider and the client in compliance with the trust policy according to evaluation by the trust broker comprises:
   sending the certificate received at the service provider from the trust broker to the client to affirm attestation of the service provider in compliance with the trust policy according to evaluation by the trust broker; and
   wherein the method further comprises receiving a client certificate from the client, the client certificate having been received at the client from the trust broker, wherein the client certificate affirms to the service provider attestation of the client in compliance with the trust policy according to evaluation by the trust broker.

8. The method of claim 1, wherein encrypting the information exchanged between the service provider and the client via the hardware based key comprises:
   encrypting the information via an Attestation Identity Key (AIK) received from the client, wherein the client then utilizes the AIK key to decrypt the encrypted information from the service provider and further to encrypt communications sent to the service provider.

9. The method of claim 1, wherein encrypting the information exchanged between the service provider and the client via the hardware based key comprises:
   encrypting the information via a cryptographic key generated by the trust broker and received by the service provider from the trust broker subsequent to successful attestation of the service provider in compliance with the trust policy according to evaluation by the trust broker.

10. The method of claim 1, wherein encrypting the information exchanged between the service provider and the client via the hardware based key further comprises:
    sending the encrypted information to the client, wherein the client unwraps a token provided by the trust broker subsequent to successful attestation of the client in compliance with the trust policy according to evaluation by the trust broker, and wherein the token is used by the client to decrypt the encrypted information sent by the service provider.

11. The method of claim 1, wherein sending the certificate from the service provider to the client for affirming mutual attestation of both the service provider and the client in compliance with the trust policy according to evaluation by the trust broker comprises the certificate sent by the service provider being valid only for the unique mutually attested relationship between the service provider and the client, each having successfully completed mutual attestation together with the trust broker for the requested service.

12. The method of claim 1, further comprising:
    invalidating the certificate received from the trust broker based on an event unrelated to the client, wherein invalidating the certificate terminates the connection between the service provider and the client for the service provider to render the requested services to the client until a subsequent re-attestation by the service provider and the client with the trust broker.

13. The method of claim 1, further comprising:
    receiving notification from the trust broker to invalidate the certificate received from the trust broker based on an event unrelated to the client;

invalidating the certificate responsive to the notification from the trust broker; and wherein invalidating the certificate terminates the connection between the service provider and the client for the service provider to render the requested services to the client until a subsequent re-attestation by the service provider and the client with the trust broker.

14. The method of claim 1, further comprising:

terminating the connection between the service provider and the client for the service provider to render the requested services to the client until a subsequent re-attestation by the service provider and the client with the trust broker responsive to the client invalidating a requester certificate at the client received from the trust broker being utilized for receiving the requested services from the service provider.

15. The method of claim 14, wherein the client invalidates its requester certificate responsive to one or more of:

a certificate expiration event;
a reboot event at the client;
a session timeout event at the client;
a hardware change at the client;
a software signature change at the client;
a firmware signature change at the client; and
a tamper detection event at the client.

16. The method of claim 1:

wherein the client is one of a plurality of known subscribers of the services provided by the service provider; and
wherein each individual client of the plurality of known subscribers must perform mutual attestation with the service provider via the trust broker to receive a unique requester certificate from the trust broker affirming mutual attestation that both the service provider and that individual client are in compliance with the trust policy according to evaluation by the trust broker; and
wherein the certificate received at the service provider from the trust broker attesting to compliance of the service provider with the trust policy is unique and specific to that individual client, the certificate received at the service provider from the trust broker being unusable to provide any service to any other one of the plurality of known subscribers besides that individual client.

17. The method of claim 1, wherein the trust policy of the service provider requires at least a password generated by an Identity Protection Technology (IPT) compatible hardware component of the client.

18. The method of claim 1, wherein the trust policy of the service provider requires at least all entities attest adherence to a plurality of hardware and firmware or software requirements as a pre-requisite to rendering the services requested.

19. The method of claim 1, wherein the service provider is a provider of high assurance services selected from the group comprising:

remote access to health care information;
remote access to medical information;
remote access to government contract information;
remote access to financial services information;
remote access to military information;
remote access diplomatic information; and
remote access to legal documents subject to confidentiality.

20. The method of claim 19, wherein the provider of high assurance services comprises a cloud computing services entity which permits access to private information over a publicly accessible network subject to compliance with a plurality of hardware and firmware or software requirements by a client requesting access.

21. The method of claim 1, wherein the trust policy of the service provider comprises one or more of the following pre-requisites to accessing the service requested:

a bios type;
a bios revision level;
a minimum patch level and minimum revisions for each of a plurality of patches specified by the minimum patch level;
a cryptographic component provided to the client from the attestation verifier;
the Trusted Platform Module (TPM) integrated with the client's hardware; and
a cryptographic component signed by an Enhanced Privacy ID (EPID) compatible component of the client's hardware.

22. The method of claim 1, wherein the client is embodied within one of a tablet computing device or a smartphone.

23. One or more non-transitory machine readable storage media having instructions stored thereon that, when executed by a processor and a memory of a service provider, the instructions cause the service provider to perform operations comprising:

receiving, at the service provider, a request from a client, the request being for services from the service provider to the client;
sending to a trust broker, from the service provider, a trust policy of the service provider against which trustworthiness attributes and capabilities of both the service provider and the client are to be evaluated by the trust broker;
receiving, at the service provider, a certificate from the trust broker attesting to compliance of the service provider with the trust policy;
sending the certificate from the service provider to the client for affirming mutual attestation of both the service provider and the client in compliance with the trust policy according to evaluation by the trust broker;
establishing a connection between the service provider and the client for the service provider to render the requested services to the client;
encrypting information exchanged between the service provider and the client in fulfillment of the request for services from the client; and
wherein the trust broker is a Trusted eXecution Technology (TXT) compatible attestation verifier to communicate with a first Trusted Platform Module (TPM) integrated with the client's hardware and further to communicate with a second TPM integrated with the service provider's hardware.

24. The one or more non-transitory machine readable storage media of claim 23, wherein the service provider is a provider of high assurance services selected from the group comprising:

remote access to health care information;
remote access to medical information;
remote access to government contract information;
remote access to financial services information;
remote access to military information;
remote access diplomatic information; and
remote access to legal documents subject to confidentiality.

25. The one or more non-transitory machine readable storage medium of claim 23, wherein the provider of high assurance services comprises a cloud computing services entity which permits access to private information over a publicly accessible network subject to compliance with a plurality of hardware and firmware or software requirements by a client requesting access.

26. The one or more non-transitory machine readable storage media of claim 23, wherein the client is embodied within one of a tablet computing device or a smartphone.

27. A system comprising:
a processor;
a memory;
a trust broker to execute at the system via the processor and the memory; and
a service provider to provide services;
wherein a client of the services provider is to send a request for the services to the service provider, the request triggering a mutual attestation event by the service provider and the client via the trust broker;
wherein the service provider initiates a request for an attestation certificate from the trust broker responsive to receiving the request for services from the client,
wherein the trust broker performs mutual attestation of both the service provider and the client by evaluating trustworthiness attributes and capabilities of both the service provider and the client separately, according to a trust policy provided by the service provider,
wherein the trust broker returns a certificate to the service provider and a requester certificate to the client device, the certificate and the requester certificate affirming mutual attestation of both the service provider and the client in compliance with the trust policy according to evaluation by the trust broker,
wherein the client is to send the requester certificate returned from the trust broker to the service provider,
wherein the service provider determines whether the client meets predetermined trust policy criteria for the services, based on the requester certificate sent by client to the service provider,
wherein the service provider provides the requested services to the client only if the client meets the predetermined trust policy criteria for the services; and
wherein the trust broker is a Trusted eXecution Technology (TXT) compatible attestation verifier to communicate with a first Trusted Platform Module (TPM) integrated with the client's hardware and further to communicate with a second TPM integrated with the service provider's hardware.

28. The system of claim 27:
wherein the attestation certificate for the service provider identifies and attests to device capabilities of the service provider through the trust broker; and
wherein the requester certificate for the client identifies and attests to device capabilities of the client processing system through the trust broker.

29. The system of claim 28:
wherein the certificate for the service provider includes a first session identifier;
wherein the requester certificate for the client processing system includes a second session identifier;
wherein the service provider further determines whether the session identifier from the requester certificate for the client processing system matches the session identifier from the certificate for the server processing system; and
wherein the service provider provides the requested services to the client only if the session identifier from the requester certificate for the client matches the session identifier from the certificate for the service provider.

30. The system of claim 27, wherein the client is embodied within one of a tablet computing device or a smartphone.

* * * * *